United States Patent

[11] 3,576,257

| [72] | Inventor | Robert L. Yates<br>Santa Clara, Calif. |
|---|---|---|
| [21] | Appl. No. | 20,638 |
| [22] | Filed | Mar. 18, 1970 |
| [45] | Patented | Apr. 27, 1971 |
| [73] | Assignee | Lockheed Aircraft Corporation<br>Burbank, Calif. |

[54] FLUID SEPARATION DEVICE
10 Claims, 14 Drawing Figs.

| [52] | U.S. Cl. | 210/242 |
|---|---|---|
| [51] | Int. Cl. | B01d 17/02 |
| [50] | Field of Search | 210/242, 83, (Oilskim Digest) |

[56] References Cited
UNITED STATES PATENTS

| 2,876,903 | 3/1959 | Lee | 210/242X |
|---|---|---|---|
| 3,259,245 | 7/1966 | Earle | 210/83X |
| 3,358,838 | 12/1967 | Kosar et al. | 210/242X |

*Primary Examiner*—J. L. Delesare
*Attorneys*—George C. Sullivan and Rodger N. Alleman ABSTRACT: A device for separating fluids having different physical properties is disclosed which utilizes a unique drum having a plurality of substantially horizontal vanes for "concentrating"d in a relatively quite space a quantity of the fluid to be recovered while simultaneously utilizing the forces of surface tension and adhesion of such fluid to cause it to cling to a rotatable disc from which the fluid is scraped and allowed to flow into a central trough from whence it can be recovered, and further processed.

PATENTED APR 27 1971
3,576,257
SHEET 1 OF 7
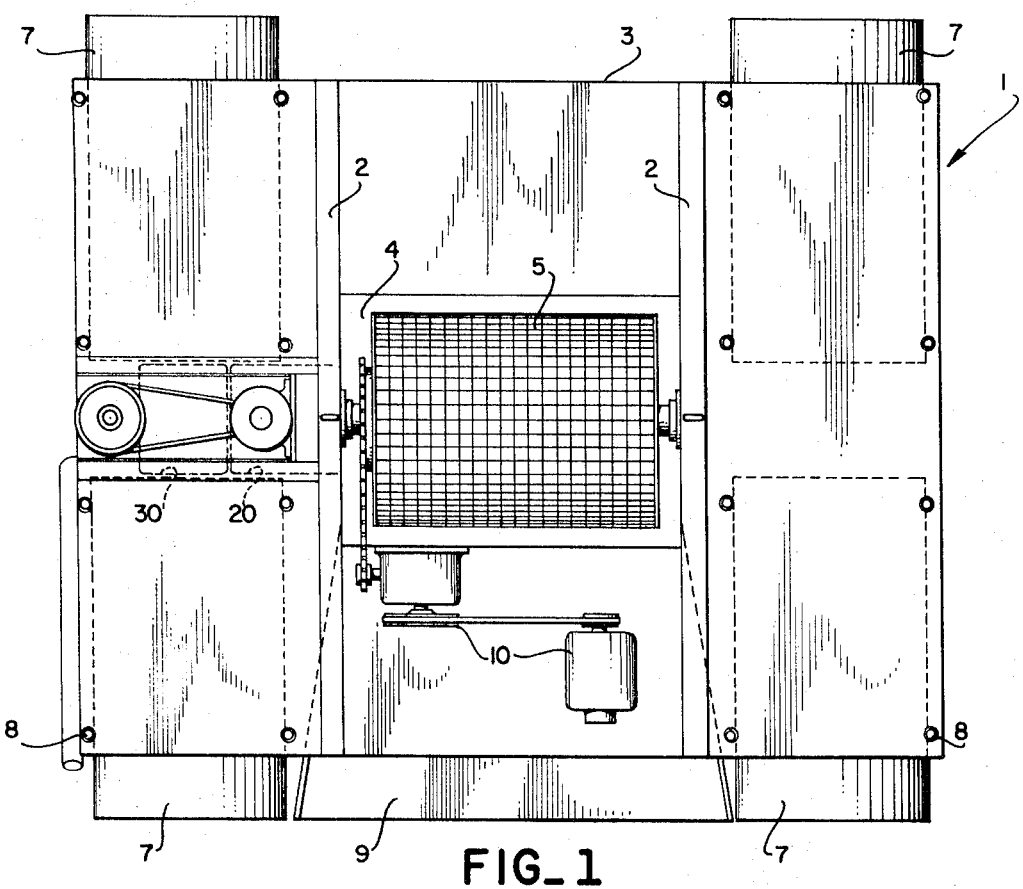
FIG_1
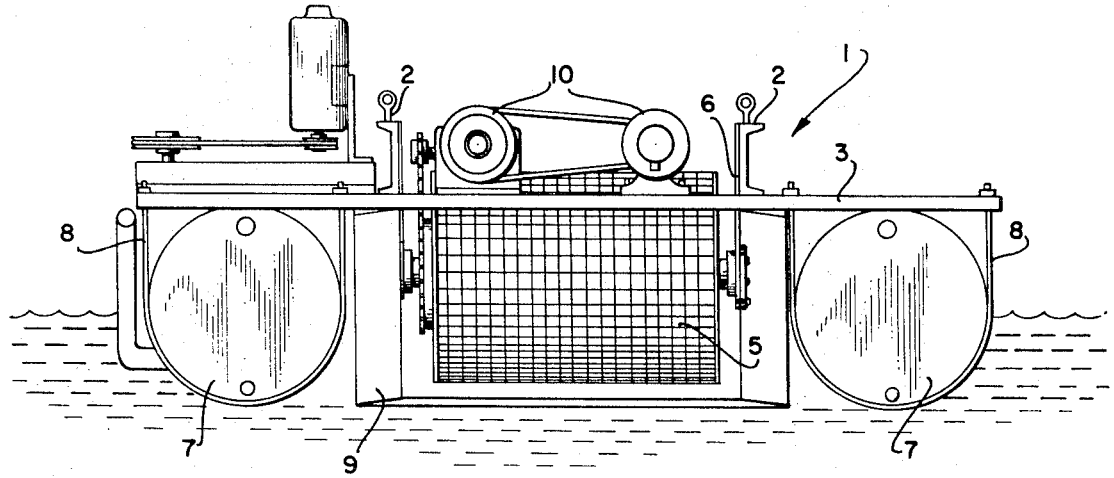
FIG_2
INVENTOR.
ROBERT L. YATES
BY George C. Sullivan, agent
Rodger N. Alleman
Attorney

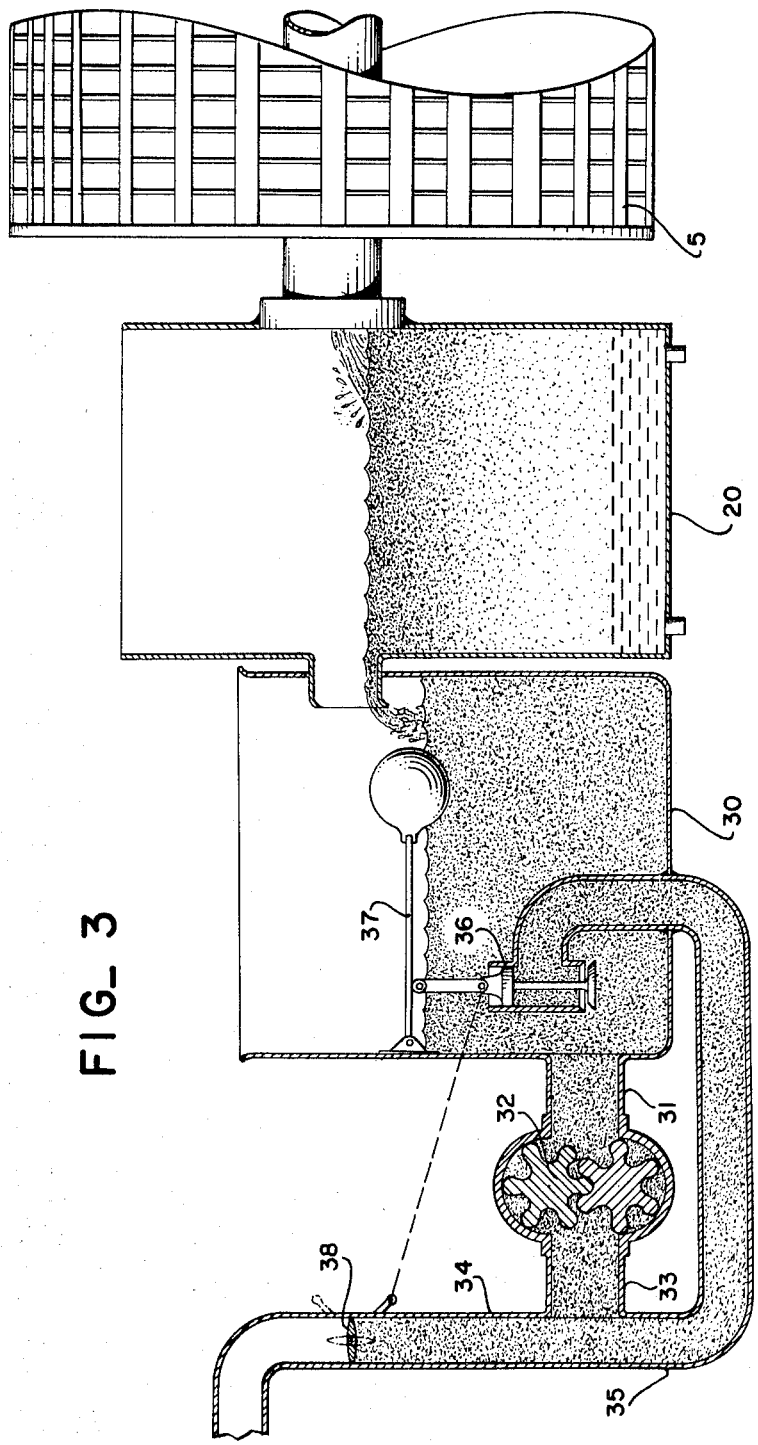

PATENTED APR 27 1971
3,576,257
SHEET 3 OF 7
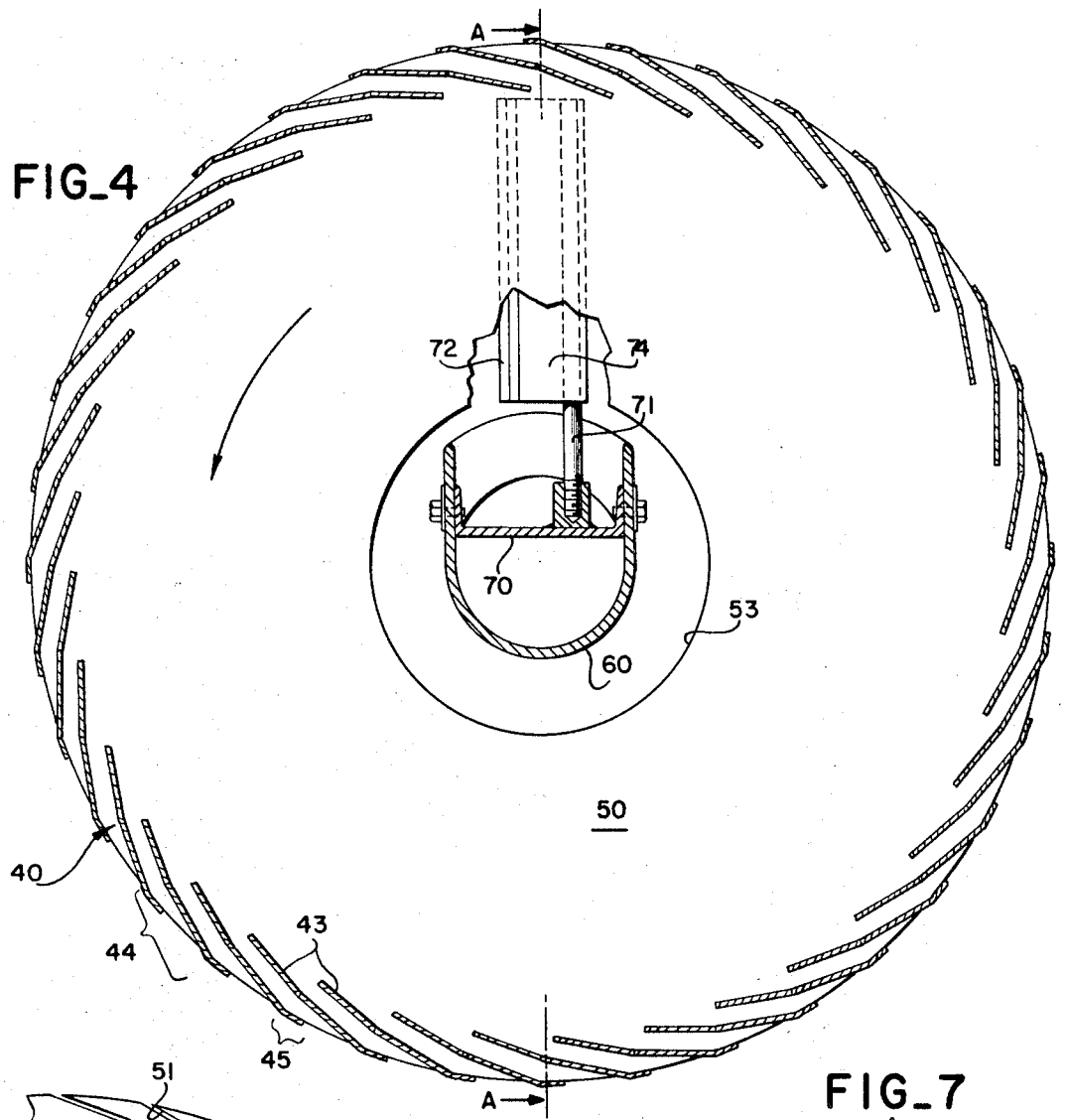
FIG_4
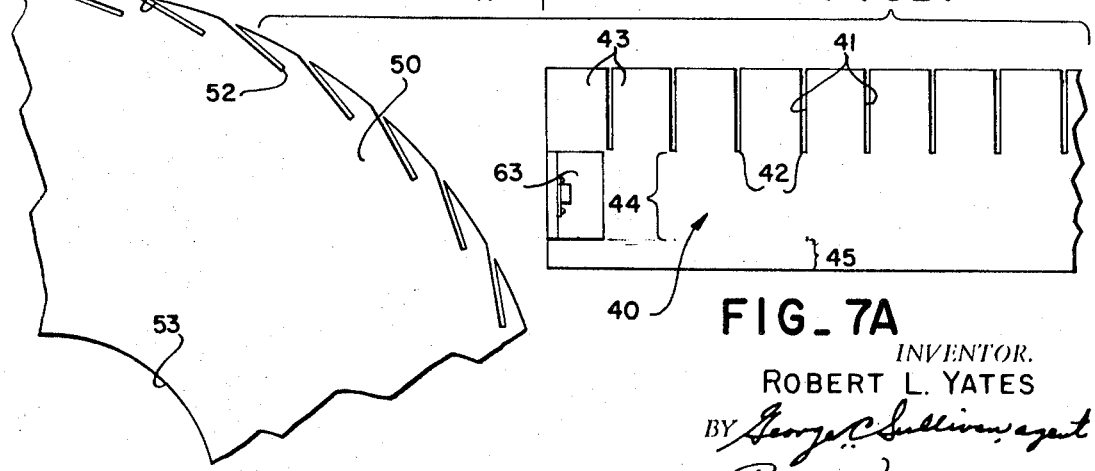
FIG_7B
FIG_7
FIG_7A
INVENTOR.
ROBERT L. YATES
BY George C. Sullivan, agent
Rodger N. Alleman
Attorney

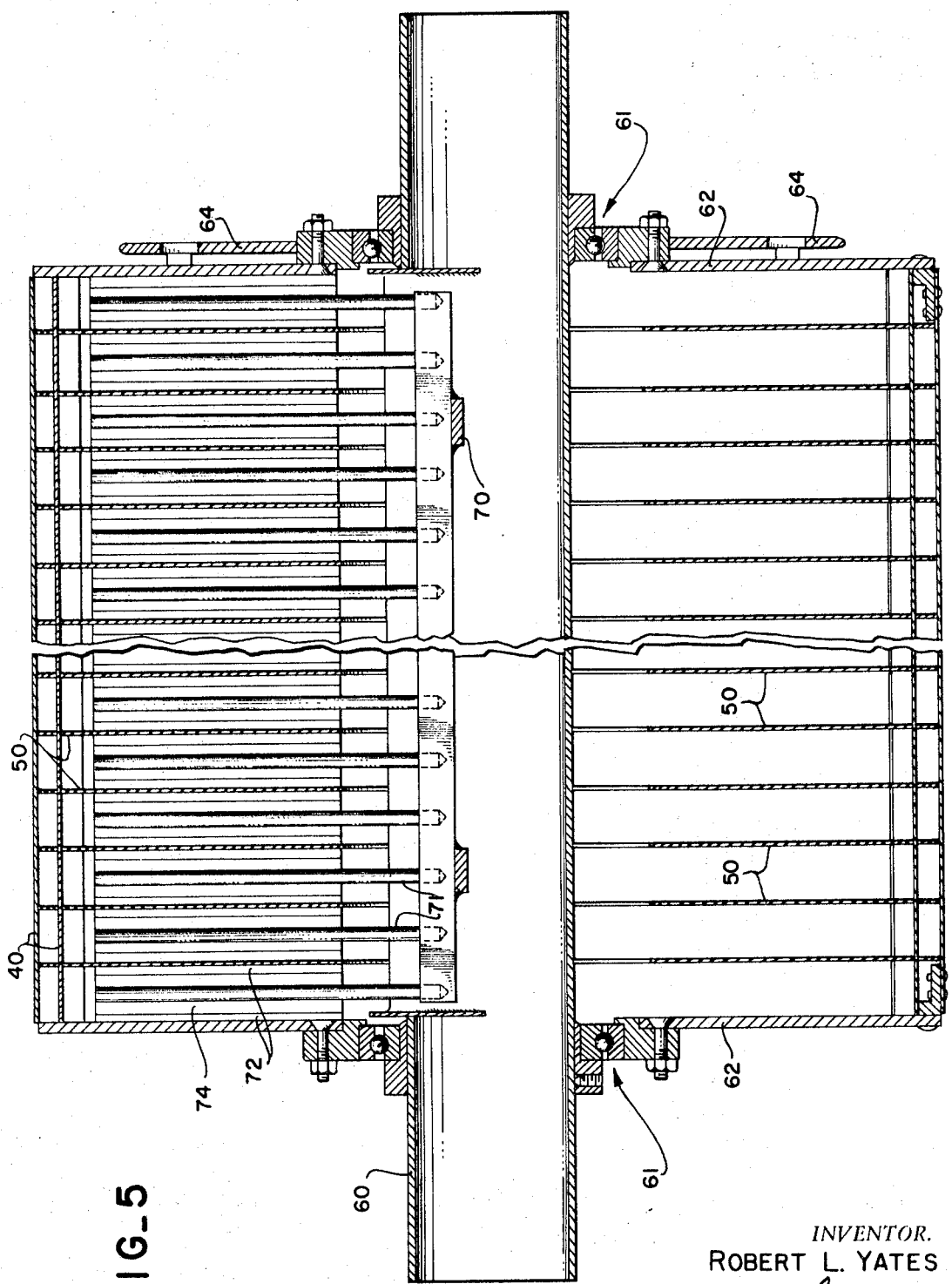

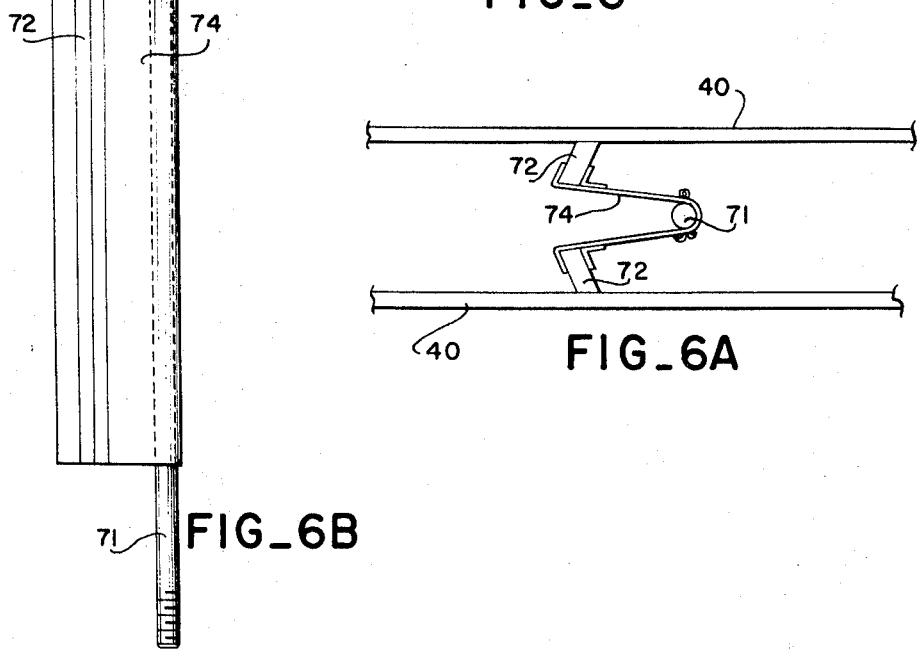
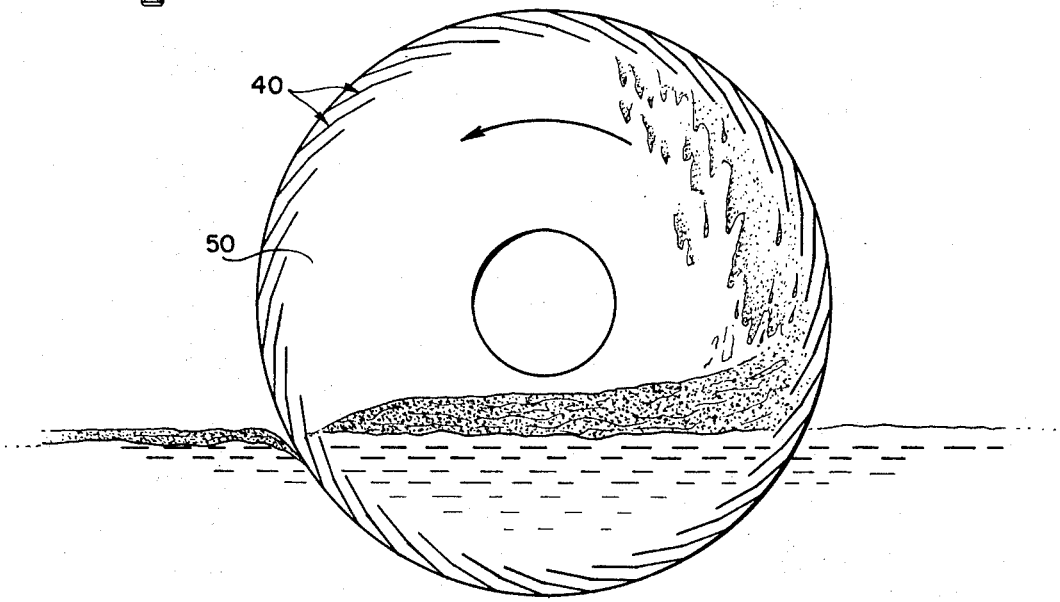

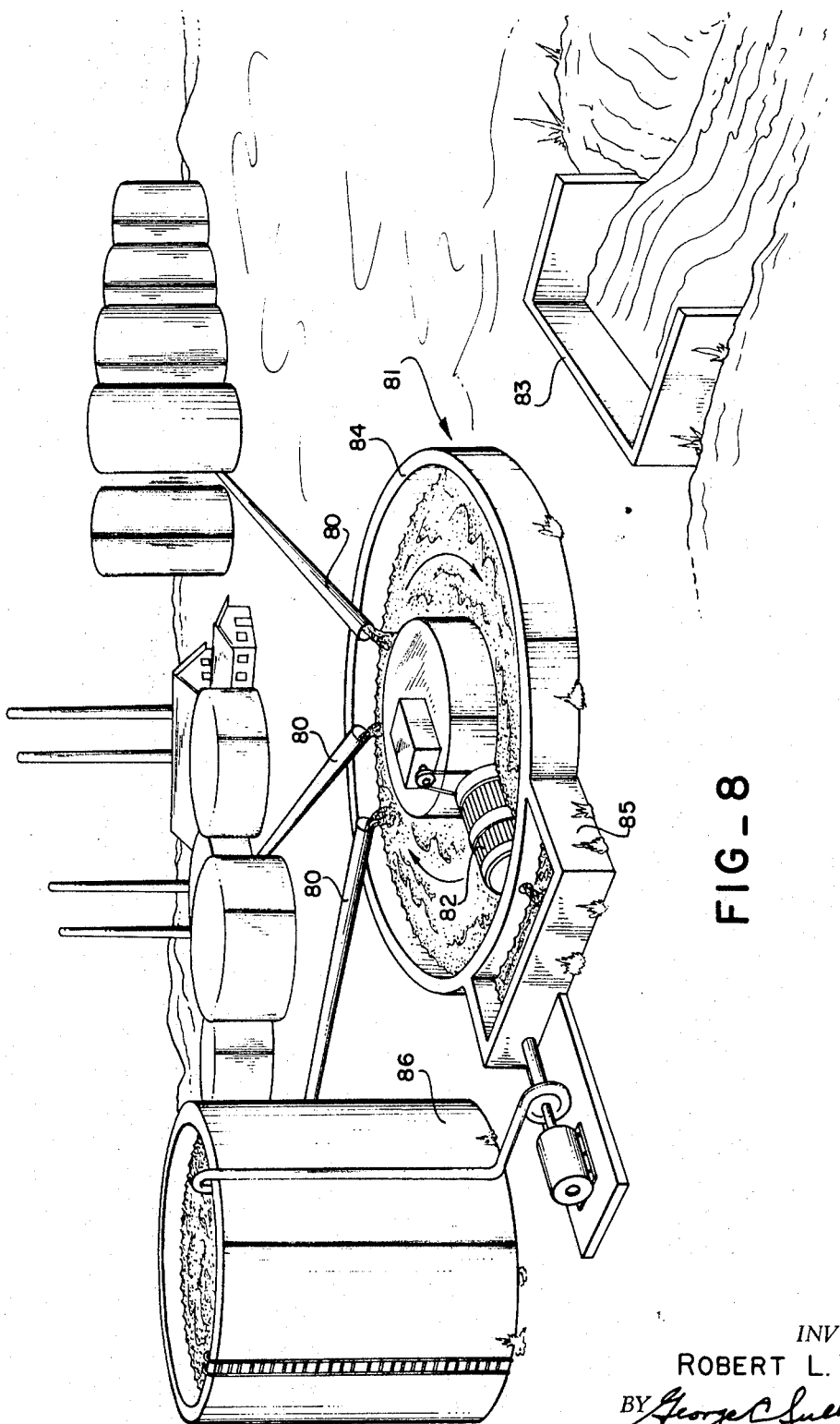

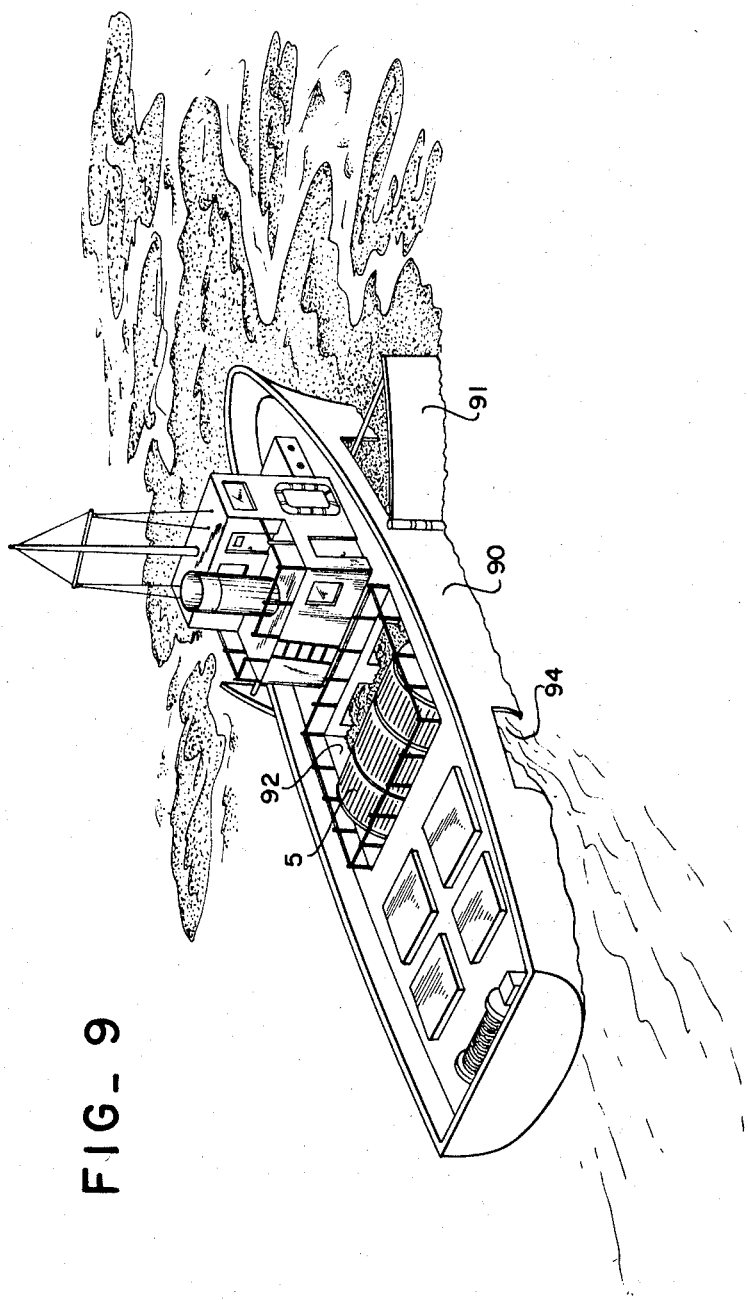

3,576,257

FLUID SEPARATION DEVICE

INTRODUCTION TO THE PROBLEM

In an increasingly industrialized world, the byproducts and waste products of civilization present an increased hazard to a safe and useable environment. Contamination of rivers, lakes and oceans frequently occur because of accidental spills (or intentional dumping) of crude oil, refined products, fish oils, vegetable oils and other essentially fluid materials which, because of the differences in density, surface tension, or other physical properties will, for relatively long periods of time, remain near the surface of or float upon the polluted waterway.

Inherently, a process or device for removing such pollutants should have utility in connection with controlled industrial separation processes where fluids of different viscosities, densities, and surface tension characteristics are to be separated one from the other. Though this application will be couched mainly in terms of removing "pollutants," it should be understood that its scope and intent is broad enough to include and cover separation of fluids of whatever kind that lend themselves to the mechanism described.

Removing unwanted materials from fluid surfaces has heretofore been approached from a number of directions and has included the use of chemical dispersants, physical removal by mechanical means, the use of burning agents, the use of floating or sinking absorbent materials, and the like. For example, the use of straw was recently employed to absorb oil from a water surface and the straw was later processed by burning it, thus casting the combustion byproducts into the atmosphere. The use of chemical dispersants is likewise usually undesirable since these materials often have an adverse effect upon the ecological balance of the environments in which they are used.

Heretofore, various types of mechanical devices have been proposed which have been successful in varying degrees in removing one fluid from another, though in general these devices have been too costly to be economically effective, have been too large to carry easily from one pollution scene to another, and most importantly, have been incapable of separating fluids at a rate which is viably effective.

DESCRIPTION OF INVENTION

I have developed and tested a device which effectively separates fluids of the type discussed at a rate of flow which is commercially effective. Accordingly, it is an object of the present invention to provide a separation device and system which will effectively separate fluids of varying viscosity, surface tension, and density. It is a further object of the invention to provide such a separation system which is highly portable and which may be transported by air, on short notice, to the scene of a pollution problem.

An additional object is to provide such a system which is low in cost and highly reliable in operation and which can be adapted for utilization in a wide variety of locations, including rivers, lakes, oceans, refineries, industrial processing, and the like.

DESCRIPTION

In accordance with these and other objects, the invention is hereunder described in combination with the attached drawings wherein:

FIG. 1 is a top plan view of a fluid recovery unit adapted to be floatingly positioned within the body of fluid from which a contaminant is to be removed;

FIG. 2 is a side elevational view of the unit shown in FIG. 1;

FIG. 3 is a side elevational view of the recovery unit showing a more detailed view of an output separation stage;

FIG. 4 is an end elevational view of the drum and disc portion of the recovery unit;

FIG. 5 is a sectional view taken upon line A–A of the FIG. 4;

FIG. 6A is a top plan view of an area between two discs showing the wiper assembly therebetween;

FIG. 6B is a side elevational view of the wiper arm unit shown in FIG. 6A;

FIG. 7, including views 7A and 7B, shows a longitudinal vane and intermediate disc structure, respectively, and the slots by which these members are interrelated;

FIG. 8 is a schematic view of a refinery installation of the invention;

FIG. 9 is an illustrative view of the invention as it might be employed in a marine vessel; and FIG. 10 is a schematic view of the internal portion of the drum showing the effect of "concentration" upon a fluid to be removed from an unlike fluid surface.

With initial reference to FIG. 1, there is shown a floatable version of the recovery unit 1 which is mounted upon a pair of frame beams 2 to which is secured a platform 3 which is provided with a central aperture 4 which accommodates a separation drum 5 which is rotatably journaled on the frame beams 2 by a pair of extension brackets 6.

Extending downwardly from opposite sides of the platform 3 are a plurality of buoyant chambers 7 which are secured to the platform 3 in any suitable manner, for example, by U-brackets 8. Of course the inventor contemplates the use of stationary girds or support means to be within the scope of the invention. From a comparison of FIGS. 1 and 2, it will be seen that a channel member having a generally fan-shaped fluid scoop 9 is provided which serves to channel fluids between the buoyant chamber 7, underneath platform 3 and into the area under the platform occupied by the separation drum 5. The fluid scoop 9 prevents vertical currents in the fluid and tends to create a horizontal flow past the drum 5. This assists in preventing intermixing of the oil and water at lower depths, beyond the "reach" of the drum, thus facilitating recovery or pickup. Separation drum 5 may be power operated as, for example, through motor and gear assembly 10.

As shown in FIG. 1, the recovery unit 1 is also provided under platform 3 with a reservoir system including a separator chamber 20 and a sump chamber 30, reference being taken to the more detailed showing of these chambers in FIG. 3. Fluid being discharged from separation drum 5 after having been removed in a manner which will hereinafter be described in greater detail from the fluid in which the recovery unit 1 floats is introduced into the separator chamber 20 where any trapped water or other nondesirable material will tend to be separated so that a "purified" or substantially unmixed oil or other fluid can be introduced into sump chamber 30. The contents of sump chamber 30 are regulated by the float valve sump assembly shown wherein there is provided from chamber 30 an exit pipe 31 which is channeled into a pump 32 having an outlet pipe 33 with a branch 34 leading to a storage chamber and a return branch 35 leading back into the sump chamber 30. Fluid in return branch 35 is selectively emptied into chamber 30 by means of the valve assembly shown at 36 which operates in connection with the float 37. When the contents of sump chamber 30 is "low" valve 36 is opened by the action of float 37, and valve 38 being gauged to valve 36 is closed all in a manner conventionally known. This causes pump 32 to recirculate fluid through lines 31, 33 and 35 which returns into chamber 30 and maintains a constant supply of fluid through the pump. As the fluid in sump 30 rises, the float 37 is raised, shutting off valve 36 and opening valve 38, thus allowing fluid to be pumped directly to storage.

Having thus described one adaptation of my recovery system invention, attention will now be directed to a more detailed description and explanation of the fluid recovery unit wherein a reference to FIGS. 4 through 7 is apropos. As shown in FIG. 4, the drum is generally indicated by numeral 5 and will be seen to consist of a plurality of vanes 40 which are secured in essentially equally spaced longitudinal relationship by a series of discs 50. With reference to FIG. 7, the particular manner in which vanes 40 and discs 50 are interrelated and interconnected will be understood to be accomplished by a series of slots 51 in disc 50 and 41 in vanes 40. When in fully connected position, the vane slot saddles 42 will be abutted against disc slot saddles 52. As shown in FIG. 7A, the vanes 40 are shaped so that the trailing edge portions 43 are angled slightly so that when in position around the circumferential periphery of discs 50, the trailing edge portion 43 of one vane is essentially parallelly disposed and spaced from the main body portion 44 of the vane to which it is next adjacent. It will also be noted that leading edge portions 45 of vanes 40 are angled slightly so that when the vanes are positioned in place, the leading edge portions 45 will be substantially parallel to the periphery of the discs 50.

Each of discs 50 are provided with a central aperture 53 which allows fixed axle 60 to pass therethrough. Thus assembled, vanes 40 and discs 50 constitute a drum member which is characterized on its outer surface by a series of peripheral, longitudinally extending slots 43 which are open to the interior of the drum. The slots 43 are transversely bisected by the discs 50 which, as shown in FIG. 5, provide a series of walls in the longitudinal slots thus in effect breaking the outer peripheral surface of the drum into a series of square or rectangular openings leading through channels of essentially the same shape into the inner area of the drum 5.

The drum structure as previously described is mounted upon a fixed axle 60 through a bearing assembly shown generally at 61 attached to drum support end plates 62 which are very similar though preferably somewhat thicker than discs 50, it being noted that drum support end plates 62 preferably are not provided with slots 51. Also, it is desirable to attach each of the ends of vanes 40 to drum support discs 62 in a suitable manner as for example shown by the angular fittings 63. If drum 5 is power driven, it may be turned, for example, by means of a suitable drive sprocket 64.

Returning to a discussion of fixed axle 60, it will be seen that the portion of the axle which is internal to the drum is open at the top thus providing a channel-shaped trough through the hollow axle 60 through which fluid can flow.

Appropriately mounted internally of the channel in fixed axle 60 is a wiper support bracket 70 which may be either unitary, with suitable apertures allowing free entry of fluid into the inside of hollow axle 60, or with a multiplicity of segmented brackets with portions therebetween to accomplish the same purpose. Mounted upon wiper support bracket 70 are a series of wiper support shafts 71 extending generally upwardly between each of the discs 50 substantially to the point of tangency with the ends of trailing edge portions of 43 of vanes 40.

Mounted upon wiper support shafts 71 are wipers 72 which are secured to the support shafts 71 by channel-shaped wiper mounting springs 74. It is noted that wipers 72 may be of any desirable material though applicants have found that nylon is suitable, particularly when discs 50 are manufactured of aluminum. Obviously, any suitable combination of materials could be substituted to accommodate the requirements for particular physical characteristics of the fluids to be separated and recovered. Manifestly, wiper mounting springs 74 containing wipers 72 therein will, when compressed for positioning between discs 50, exert a wiping pressure against the discs as they are rotated against the wipers, thus scraping off most material adhering to the discs causing it to fall within the open channel in hollow fixed axle 60.

FIG. 8 shows the recovery unit of the invention as adapted and installed in a refinery-type application where there is schematically shown a plurality of inlet pipes 80 entering into a generally circular recirculating pool 81 which is provided with a separation unit 82 in accordance with the invention. An outlet 83 from the recirculating pool is shown, it being noted that it is important to provide for a retaining wall or other separating member generally indicated at 84 between the mixed fluids entering into the recirculating pool and the outlet 83. It is to be noted that outlet 83 is horizontally beneath the surface of fluid to be maintained in the recirculating pool 81 and desirably is placed at the level of water (as distinct from oil) to be maintained. The recirculating pool structure is provided at one side with a sump 85 into which separated fluid is adapted to flow via the hollow axle of the separating drum from whence it is pumped into storage facility such as tank 86 or the like. A suitable aperture is placed near the bottom of the wall between the storage facility and the sump 85 to allow water to return to the recirculating pool. In operation of the adaptation shown in FIG. 8, a mixture of, for example, oil and water is introduced in the recirculating pool 81, with the oil generally floating to the surface of the pool and being recovered by the recovery drum 82 and funneled into sump 85 for storage. Water is excited from the recirculating pool as shown in the outlet weir at 83.

FIG. 9 shows a recovery system in accordance with the invention installed in a marine vessel 90 which may be provided with suitable inlet apertures and/or scoops 91 leading into a central well 92 within which is installed a separation drum 5. In a manner similar to that explained in connection with FIG. 8, fluids to be separated from the surface of the water would be ingressed through the aperture and scooped into the forward part of the vessel, subjected to the action of separating drum 5 with the oil stored aboard the vessel and the water being exited through exit ports 94 near the stern of the vessel.

OPERATION

Operation of the device will now be discussed with oil and water as the fluids to be separated, these fluids being typical of the characteristics afforded by the separation/recovery unit. It is generally known that the surface tension of oil floating on water is such that if a portion of the oil is removed, the "indentation"or trough left in the oil is immediately filled by the action of oil drawn thereinto because of inherent surface tension characteristics. In accordance with the invention, such an indentation in oil or a break in the surface thereof on water is accomplished by means of the discs 50 which are suitably positioned on the surface of the water so that the bottom portion of the drum and discs extends substantially below the thickness of the oil film to be removed. As the drum is rotated either by applied power or by means of self-rotation due to the shape of the vanes as the drum is propelled across the water surface, the discs, due to the surface tension of the oil, pickup a portion of the oil and carry it with the rotation of the discs toward and against the wiper blades 72 where it is scraped off and allowed to fall by the action of gravity into the open trough in the hollow axle 60.

It is especially important to note that as shown in FIG. 10 the vanes constituting the drum provide an essentially closed internal area within the drum in which the action of wave motion is substantially reduced from that outside the drum. Also, the effects of wind and other disturbances are minimized. Additionally, the vanes as shown in FIG. 10, operate to thicken the level of oil within the drum over that floating on the water outside the drum and in this manner serves to "concentrate" the oil for pickup by the discs as they are rotated. Thus, the front descending vanes cause oil to be pushed toward the center of the drum. Simultaneously, the aft (ascending) vanes tend to push the oil toward the center, concentrating on thickening the oil to at least the overlap capability of the vanes, and preventing oil from escaping downstream from the rear of the vent. This is especially important in removing thin coatings from a fluid surface.

I claim:

1. A device for separating liquids of differing physical properties comprising:
   a hollow nonrotatable axle, at least one end of which is open,
   a plurality of flat, circular discs rotatably secured to said axle at substantially right angles thereto,
   at least one opening in the upper surface of said axle extending under each of said discs,
   a plurality of wipers secured to said axle and impinging against at least one side of each of said discs, said wipers being displaced so that the lower portions thereof are substantially vertically aligned with said opening, whereby materials scraped from the surface of said discs will fall through said openings and into the hollow portion of said axle, drum means secured to said axle and adapted to rotate in conjunction with said discs, said drum means including a plurality of vanes extending parallel to and equidistantly from said axle.

2. A device for separating liquids of differing physical properties as claimed in claim 1 and which includes at least one sump associated with the open end of said axle for receiving liquids therefrom, and pump means associated with said sump for removing liquid from said sump while maintaining a substantially constant level of liquid therein.

3. A device for separating liquids of differing physical properties as claimed in claim 2 in which said vanes are interlockingly secured to each of said discs and in which the outer leading edges of said vanes overlap the inner trailing edges of the adjacent vane.

4. A device for separating fluids of differing physical properties as claimed in claim 3 in which said vanes each have an outer portion substantially tangent to the periphery of said discs, and in which the trailing edges of said vanes extend generally spirally inwardly, the vanes and the outer portions of the discs constituting a series of grid channels through which fluids may be introduced into the inner portion of said drum where portions can be picked up by adhesion onto said discs as they rotate.

5. A device for separating fluids of differing physical properties comprising:

a support frame, means attached to said frame and adapted to provide support in fluid media, a channel member suspended from the underportion of said frame having a flared, scoop portion on at least one end thereof, said channel member and said scoop portion being adapted to be positioned beneath the surface of the fluids in which said frame is suspended, a hollow, nonrotative axle having a longitudinal opening in the upper surface thereof extending transversely across said channel, a pair of end plates rotatably mounted on said axle, a plurality of vanes attached to said end plates equidistantly from said axle and adapted to rotate thereabout in conjunction with said end plates, a series of discs interlockingly secured to each of said vanes and extending inwardly and within the drum formed by said vanes, said discs and said drum assembly being adapted to extend into and beneath the surface of the fluid on which said assembly is floated, wiper blades mounted upon said axle and flexibly biased into scraping engagement with the surface of said discs, the bottom ends of said wiper blades being positioned above the longitudinal opening in said axle, a reservoir sump system for receiving fluid as it exits from said hollow axle, and pump means associated with said reservoir sump for removing fluids from said sump.

6. A device for separating fluids of differing physical properties as claimed in claim 5 which includes power means to rotate said drum about said axle, and in which the leading edges of said vanes overlap the trailing edges of the next adjacent vane.

7. A device for separating fluids of differing physical properties as claimed in claim 4 in which said reservoir sump system includes:

a separator chamber adapted to receive fluid from said axle and including ports in the lower portion thereof which are open to the fluid supporting said frame;

a sump chamber associated with said separator chamber and adapted to receive fluid from said separator chamber; and pump means associated with said sump chamber for removing fluid therefrom.

8. A device for separating fluids of differing physical properties comprising:

receptacle means of such shape as to allow fluid flow in a substantially circular manner, a hub substantially in the center of said receptacle means, a hollow axle substantially traversing the distance between the hub and the outer periphery of said receptacle, said axle having an opening in the upper portion thereof, a plurality of discs journaled upon and adapted to rotate about said hollow axle, wiper means associated with said discs for scraping fluid therefrom as the discs rotate therepast, drum means surrounding said disc and wiper assemblies, said drum means comprising a series of separated, overlapping vanes equidistantly journaled on said axle and adapted to rotate in conjunction with said discs, a sump associated with the outer periphery of said receptacle means, an aperture leading from the hollow axle into said sump, a passageway positioned substantially at the base of the wall separating said sump from said receptacle, means to remove fluid from said sump, and an overflow outlet weir associated with said receptacle, said weir having an aperture in communication of the interior of said receptacle which aperture is positioned near the operating level of the heavier of the fluids to be separated.

9. A device for separating fluids of differing physical properties comprising:

axle means constituting a hollow cylinder, at least one end of which is open, at least one disc rotatably secured to said axle means and adapted to be partially immersed in the fluids to be separated, wiper means associated with said disc for removing fluids from the disc as it rotates therepast, an opening in the upper portion of said axle located substantially beneath said wiper means and adapted to receive fluids as it is removed from said disc by said wiper means, and drum means surrounding said disc and wiper assemblies.

10. A device for separating fluids of differing physical properties comprising:

axle means, at least one disc rotatably secured to said axle means and adapted to be partially immersed in the fluids to be separated, wiper means associated with said disc for removing fluids from the disc as it rotates therepast, and drum means surrounding said disc and wiper assemblies, said drum means including a plurality of separated, overlapping, vanes equidistantly journaled on said axle and adapted to rotate in conjunction with said disc, the distance between said vanes being such as to allow ingress into the interior of the drum of the fluids to be separated.